(12) United States Patent
Chevrette et al.

(10) Patent No.: US 7,731,478 B2
(45) Date of Patent: Jun. 8, 2010

(54) METHOD AND APPARATUS FOR VARIABLE CLEARANCE PACKING

(75) Inventors: Richard Chevrette, North Greenbush, NY (US); Frederick G. Baily, Galway, NY (US)

(73) Assignee: General Electric Company, Schenectady, NY (US)

( * ) Notice: Subject to any disclaimer, the term of this patent is extended or adjusted under 35 U.S.C. 154(b) by 515 days.

(21) Appl. No.: 11/441,286

(22) Filed: May 25, 2006

(65) Prior Publication Data

US 2007/0274829 A1  Nov. 29, 2007

(51) Int. Cl.
*F01D 11/12* (2006.01)
*F01D 25/24* (2006.01)

(52) U.S. Cl. ............... 415/173.5; 415/174.2; 415/174.5

(58) Field of Classification Search .............. 415/173.5, 415/174.2, 231, 174.5
See application file for complete search history.

(56) References Cited

U.S. PATENT DOCUMENTS

| | | | |
|---|---|---|---|
| 5,002,288 A | 3/1991 | Morrison et al. | |
| 5,395,124 A | 3/1995 | Brandon | |
| 5,464,226 A | 11/1995 | Dalton | |
| 5,603,510 A * | 2/1997 | Sanders | 277/413 |
| 5,709,388 A | 1/1998 | Skinner et al. | |
| 5,980,204 A | 11/1999 | Chevrette | |
| 6,022,027 A | 2/2000 | Chevrette et al. | |
| 6,065,754 A | 5/2000 | Cromer et al. | |
| 6,145,844 A * | 11/2000 | Waggott | 277/412 |
| 6,250,641 B1 * | 6/2001 | Dinc et al. | 277/355 |
| 6,572,115 B1 | 6/2003 | Sarshar et al. | |
| 6,651,986 B2 | 11/2003 | Chevrette et al. | |
| 6,655,696 B1 * | 12/2003 | Fang et al. | 277/409 |
| 6,695,316 B2 | 2/2004 | Popa et al. | |
| 6,715,766 B2 | 4/2004 | Kirby, III et al. | |

OTHER PUBLICATIONS

EP Search Report, App. No. 07108513, Nov. 29, 2007.

\* cited by examiner

*Primary Examiner*—Edward Look
*Assistant Examiner*—Sean J Younger
(74) *Attorney, Agent, or Firm*—Armstrong Teasdale LLP

(57) ABSTRACT

Methods and apparatus for a packing ring segment assembly for sealing a turbine gas path are provided. The assembly includes a sealing portion including radially inwardly directed teeth, and a dovetail mounting portion including a hollowed out portion including a biasing member internal to the packing ring segment. The biasing member is coupled to the packing ring segment and configured to engage a pair of annular shoulders of a dovetail groove in the turbine such that the packing ring segment is biasing radially outward at relatively low turbine loads and low working pressure, and at relatively high turbine loads and high working pressure a working fluid overcomes the radial biasing member forces and urge the packing ring segment radially inward.

20 Claims, 4 Drawing Sheets

METHOD AND APPARATUS FOR VARIABLE CLEARANCE PACKING

BACKGROUND OF THE INVENTION

This invention relates generally to variable clearance packing for rotatable machines and more particularly, to a method and apparatus for providing variable clearance packing utilizing retractable packing components for rotary machines such as steam and gas turbines.

Rotary machines such as steam and gas turbines used for power generation and mechanical drive applications are generally large machines consisting of multiple turbine stages. In such machines, high pressure fluid flowing through the turbine stages must pass through a series of stationary and rotary components. Annular, segmented seals mounted on the stationary components are used to control leakage of fluid along the path between the stationary and rotary components. The efficiency of the turbine is directly dependent on the ability of the segmented seals or packing segments to prevent leakage, for example, between the rotor and stator. In certain designs, external springs maintain the packing segments radially outwardly of the rotor, for example, during start-up and shut-down. After the rotor has been brought up to speed, fluid pressure is supplied between the packing segments and a cavity in the rotor casing behind the segments to displace the segments radially inwardly to obtain smaller clearances with the rotor. However, dimensions of smaller industrial turbines prevent installation of retro-fit improved seals without costly and outage extending machining.

BRIEF DESCRIPTION OF THE INVENTION

In one embodiment, a packing ring segment assembly for sealing a turbine gas path includes a sealing portion including radially inwardly directed teeth, and a dovetail mounting portion including a hollowed out portion including a biasing member internal to the packing ring segment. The biasing member is coupled to the packing ring segment and configured to engage a pair of annular shoulders of a dovetail groove in the turbine such that the packing ring segment is biasing radially outward at relatively low turbine loads and low working pressure, and at relatively high turbine loads and high working pressure a working fluid overcomes the radial biasing member forces and urge the packing ring segment radially inward.

In another embodiment, a turbine diaphragm for accommodating a rotor includes a diaphragm body having a radially inner bore and an inwardly recessed dovetail groove, a plurality of packing ring segments forming a seal ring between a first pressure region and a second pressure region wherein the first pressure is greater than the second pressure. The dovetail groove includes a shoulder portion which defines a radial opening into the dovetail groove and wherein the shoulder portion includes an annular surface. Each of the packing ring segments includes a dovetail mounting portion at least partially enclosed in the dovetail groove and at least partially supported by the annular surface. The packing ring segments include a hollowed out portion including a biasing member internal to the packing ring segments. The biasing member is positioned between the packing ring segments and the annular surface such that the packing ring segments are biasing radially outward at relatively low turbine loads and low working pressure, and at relatively high turbine loads and high working pressure a working fluid will overcome the radial biasing member forces and urge the packing ring segments radially inward.

In yet another embodiment, a turbine includes a stationary turbine casing surrounding a rotatable shaft, the casing includes an annular T-shaped groove formed therein and extending circumferentially around the shaft, the annular groove being partially defined by a pair of opposing, spaced apart annular shoulders on the casing which form an annular opening of the groove radially into the clearance area between the casing and the shaft, and a segmented seal ring including a plurality of packing ring segments supported by and at least partially enclosed in the groove, the packing ring segments including a hollowed out portion including a biasing member internal to the packing ring segments, the biasing member positioned between the packing ring segments and the annular shoulders such that the packing ring segments are biasing radially outward at relatively low turbine loads and low working pressure, and at relatively high turbine loads and high working pressure a working fluid will overcome the radial biasing member forces and urge the packing ring segments radially inward.

DETAILED DESCRIPTION OF THE INVENTION

Figure 1:
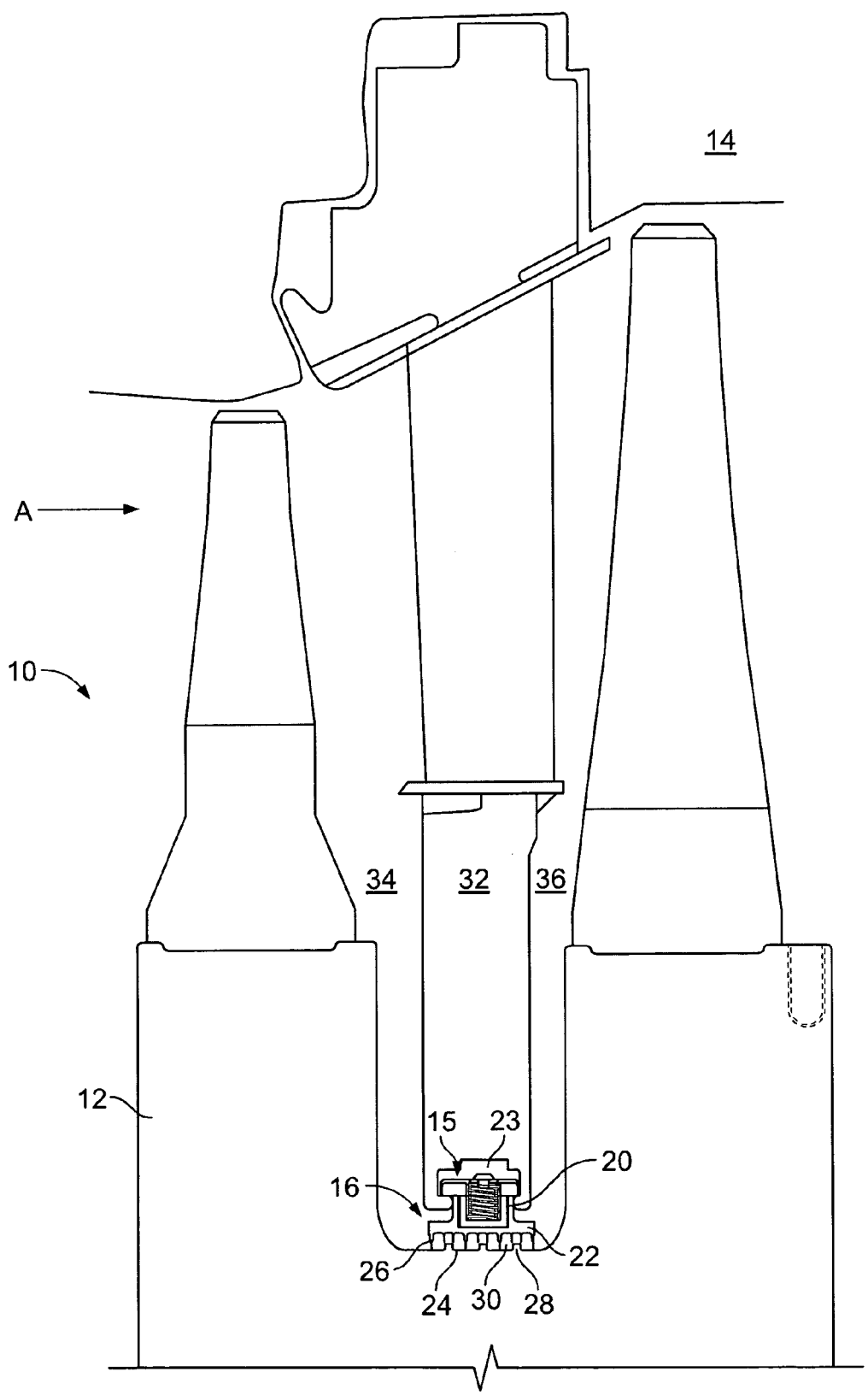
FIG. 1 is a portion of a steam turbine in accordance with an exemplary embodiment of the present invention.
Figure 2A:
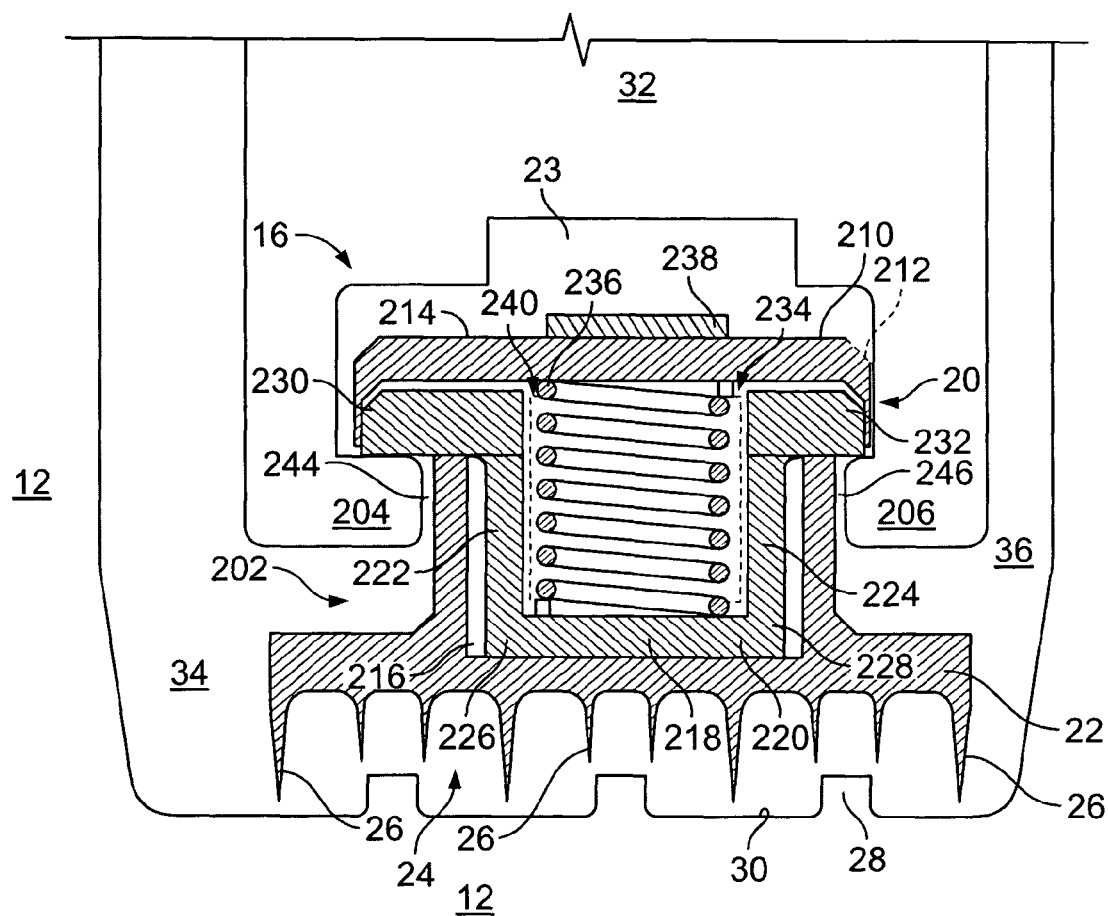
FIGS. 2A and 2B show an enlarged schematic view of the packing ring segment shown in FIG. 1 viewed circumferentially.
Figure 2B:
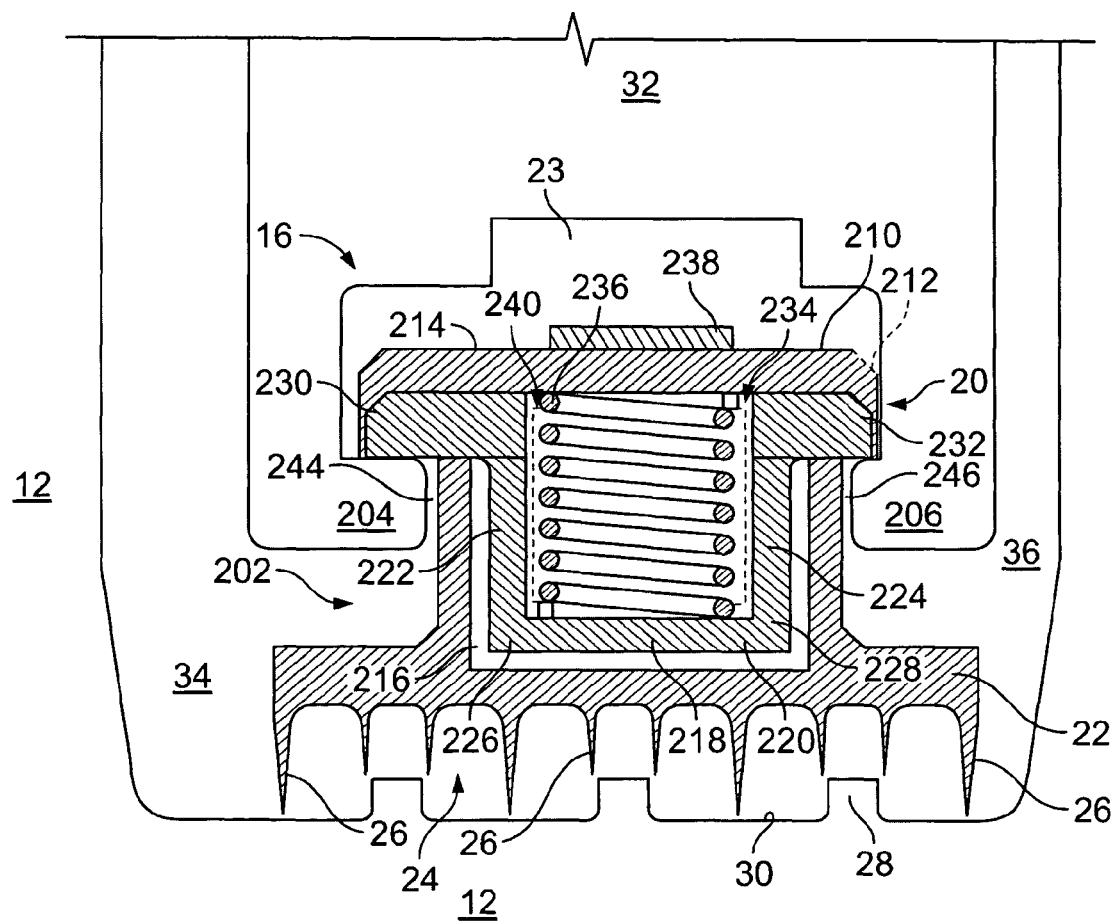

FIG. 1 is a portion of a steam turbine 10 in accordance with an exemplary embodiment of the present invention. Steam turbine 10 includes a turbine shaft 12 mounted for rotation within a turbine casing 14. An annular seal ring comprises a plurality of packing ring segments 15 (one shown in FIG. 1) each having a labyrinth seal 16 positioned about turbine shaft 12. Each segment 15 includes a dovetail mounting portion 20 and a sealing portion 22. Dovetail mounting portion 20 is configured to engage an annular T-shaped dovetail groove 23 formed in a radially inner end of a portion of diaphragm 32. Sealing portion 22 includes a sealing face 24 and radially inwardly directed teeth 26 which cooperate with annular lands and grooves 28 and 30, respectively, formed in turbine shaft 12 to provide a tortuous path for steam attempting to leak past a diaphragm 32. In general, labyrinth seal 16 functions by placing a relatively large number of partial barriers to the flow of steam (flowing in the axial direction of arrow A) from a high pressure region 34 to the low pressure region 36. Each barrier forces steam, attempting to flow parallel to the axis of turbine shaft 12, to follow a tortuous path whereby a pressure drop is created. The sum of all the pressure drops in labyrinth seal 16 is the pressure difference between the high and low pressure regions 34 and 36. FIGS. 2A and 2B show an enlarged schematic view of labyrinth seal 16 (shown in FIG. 1) viewed circumferentially. Sealing portion 22 includes a sealing face 24 and radially inwardly directed teeth 26 which cooperate with annular lands and grooves 28 and 30, respectively, formed in turbine shaft 12 to provide a tortuous path for steam attempting to leak past a diaphragm 32. Dovetail mounting portion 20 includes a necked down portion 202 sized to slidably engage a pair of opposing, spaced apart annular shoulders on diaphragm 32 which form an annular opening, for example, an upstream hook flange 204 and a downstream hook flange 206 of groove 23 formed in the radially inner end of a portion of diaphragm 32, such as diaphragm 32. Dovetail mounting portion 20 also includes a radially outer mounting portion 210 having an axial groove 212 formed in a radially outer surface 214 of dovetail mounting portion 20. Groove 212 is substantially aligned with sealing portion 22, and is in fluid communication with hollowed out portion 216. As defined herein, substantially aligned means an orientation that is either aligned or nearly aligned. Hollowed out portion, such as a recess 216 is formed radially into dovetail mounting portion 20 from radially outer surface 214 radially inward towards sealing portion 22. A U-shaped bracket 218 fits into recess 216 and includes a radially inner base 220 and a radially outwardly extending leg 222 and 224 coupled to each axial end 226 and 228, respectively of base 220. A radially outer end of each leg 222 and 224 includes flanges 230 and 232, respectively, extending axially away from one another. Flanges 230 and 232 are configured to engage upstream hook flange 204 and downstream hook flange 206, respectively. U-shaped bracket 218 includes a recess 234 configured to receive a biasing member, for example, but not limited to a spring 236. Spring 236 is secured in recess 234 using a biasing member retainer, such as a strap 238 that substantially covers a radially outer opening 240 of recess 234. Strap 238 is coupled to radially outer mounting portion 210 using one or more fasteners, for example, screw 242 arranged circumferentially about an outer periphery of strap 238.

In operation, prior to an admission of steam to turbine 10, spring 236 applies a biasing force between radially inner base 220 and radially outer mounting portion 210, which tends to move labyrinth seal 16 radially outwardly away from shaft 12. Radially inner base 220 is operatively coupled to upstream hook flange 204 and downstream hook flange 206 through legs 222 and 224 and flanges 230 and 232. The radially outer end of spring 236 pushes against strap 238 which is coupled to radially outer mounting portion 210 through screw 242. Accordingly, unopposed biasing from spring 236 pushes radially inwardly against hook flanges 204 and 206 and radially outwardly against radially outer mounting portion 210, which tends to move labyrinth seal 16 radially outwardly away from shaft 12 (as shown in FIG. 2A).

When steam is admitted into turbine 10, at least some steam bypasses diaphragm 32 through a gap between teeth 26 and lands 28 and grooves 30. As steam flow increases through the gap, eddies and other flow turbulence increase a pressure drop across each of teeth 26 and lands 28 and grooves 30 such that a sum of each individual pressure drops substantially equals a total pressure drop between high pressure region 34 and low pressure region 36. High pressure is transmitted from region 34 to dovetail groove 23 radially outward from labyrinth seal 16 through a gap 244 between upstream hook flange 204 and necked down portion 202. A machined steam seal 246 between downstream hook flange 204 and necked down portion 202 substantially prevents steam leakage from dovetail groove 23 to low pressure region 36. The high pressure above radially outer mounting portion 210 tends to move labyrinth seal 16 radially inwardly towards shaft 12 closing the gap between teeth 26 and lands 28 and grooves 30 such that sealing of steam flow between high pressure region 34 and low pressure region 36 is reduced (as shown in FIG. 2B).

Figure 3:
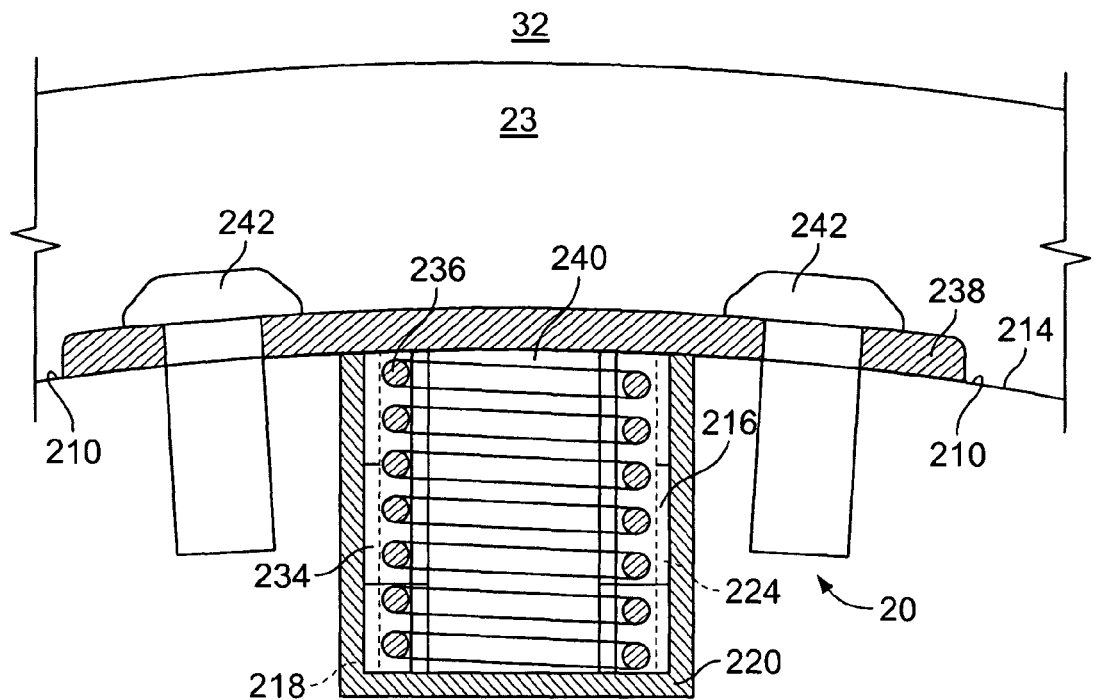
FIG. 3 is an enlarged schematic view of the packing ring segment shown in FIG. 1 viewed axially.

FIG. 3 is an enlarged schematic view of labyrinth seal 16 (shown in FIG. 1) viewed axially. Recess 216 is formed radially into dovetail mounting portion 20 from radially outer surface 214. U-shaped bracket 218 includes a radially inner base 220 and a radially outwardly extending leg 224 (shown cutaway). U-shaped bracket 218 includes recess 234 that is configured to receive spring 236. Spring 236 is secured in recess 234 using strap 238 that substantially covers a radially outer opening 240 of recess 234. Strap 238 is coupled to radially outer mounting portion 210 using screws 242 arranged circumferentially about an outer periphery of strap 238 one on each side of recess 234.

Figure 4:
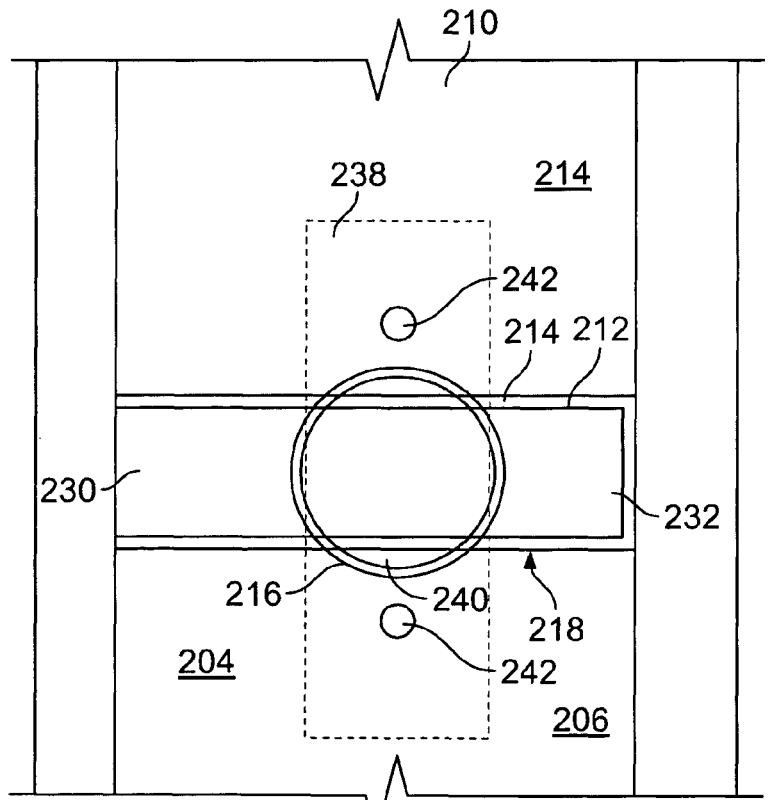
FIG. 4 is an enlarged schematic view of the packing ring segment shown in FIG. 1 viewed radially inward.

FIG. 4 is an enlarged schematic view of labyrinth seal 16 (shown in FIG. 1) viewed radially inward. Dovetail mounting portion 20 includes radially outer mounting portion 210 having axial groove 212 formed in radially outer surface 214. Recess 216 is formed radially into dovetail mounting portion 20 from radially outer surface 214. U-shaped bracket 218 fits into recess 216 and includes flanges 230 and 232 extending axially away from one another. Flanges 230 and 232 are configured to engage upstream hook flange 204 and downstream hook flange 206, respectively. Spring 236 (not shown in FIG. 4) is secured using strap 238 that substantially covers outer opening 240 of recess 234. Strap 238 is coupled to radially outer mounting portion 210 using screws 242 arranged circumferentially about an outer periphery of strap 238.

The above-described packing ring segment assembly is a cost-effective and highly reliable assembly for adjusting a clearance or gap between rotatable machine components. Specifically, a dovetail mounting portion including an internal biasing member provides sufficient headroom clearance for the packing ring segment installed in a diaphragm of a turbine while operating to seal the turbine gas path with positive pressure from a working fluid of the turbine.

While the invention has been described in terms of various specific embodiments, those skilled in the art will recognize that the invention can be practiced with modification within the spirit and scope of the claims.

What is claimed is:

1. A packing ring segment assembly for sealing a gap between two regions of an article, said packing ring segment assembly comprising:
   a sealing portion including radially inwardly directed teeth;
   a dovetail mounting portion sized to slideably engage a pair of opposing shoulders that define a dovetail groove in the article, said dovetail mounting portion comprising a hollowed out portion that extends radially inward from an outer surface of said packing ring segment towards said sealing portion;
   a bracket positioned within said hollowed out portion, said bracket comprising a pair of legs extending generally radially outward from a base, each of said pair of legs comprising a bracket flange extending outward from said leg and contacting one of the shoulders when said dovetail mounting portion is coupled within said dovetail groove; and
   a biasing member positioned within said bracket, said biasing member coupled to said dovetail mounting portion and to said bracket, said biasing member is configured to urge said packing ring segment assembly radially outward at relatively low differential pressure between the two regions, and at a relatively high differential pressure between the two regions, the differential pressure overcomes the radial biasing member forces and urges said sealing portion radially inward, said dovetail portion movable in a first direction.

2. An assembly in accordance with claim 1 wherein said dovetail mounting portion comprises a groove substantially aligned with said sealing portion, said groove being in fluid communication with said hollowed out portion.

3. An assembly in accordance with claim 1, wherein said bracket comprises a U-shaped bracket comprising a base configured to be positioned in said hollowed out portion.

4. An assembly in accordance with claim 3 wherein said biasing member is coupled to said pair of annular shoulders of a dovetail groove through said U-shaped bracket such that a biasing force generated by said biasing member is transmitted to said pair of annular shoulders through said U-shaped bracket.

5. An assembly in accordance with claim 1 further comprising a biasing member retainer configured to retain said biasing member at least partially within said hollowed out portion.

6. An assembly in accordance with claim 1 further comprising a biasing member retainer coupled to said radially outer surface of said packing ring segment.

7. An assembly in accordance with claim 1 wherein said biasing member retainer substantially covers a radially outer opening of said hollowed out portion.

8. An assembly in accordance with claim 1 wherein said biasing member is a coil spring.

9. A turbine diaphragm for accommodating a rotor, said turbine diaphragm comprising:
a diaphragm body having a radially inner bore and an inwardly recessed dovetail groove;
a plurality of packing ring segments forming a seal ring between a first pressure region and a second pressure region wherein the first pressure is greater than the second pressure;
wherein said dovetail groove includes a shoulder portion which defines a radial opening into said dovetail groove and wherein said shoulder portion includes an annular surface; and
wherein each of said packing ring segments comprise a dovetail mounting portion at least partially enclosed in said dovetail groove and at least partially supported by said annular surface, said packing ring segments including a hollowed out portion that extends radially inward from an outer surface of at least one of said packing ring segments, said hollowed out portion including a bracket positioned within said hollowed out portion and a biasing member positioned within said bracket, said bracket comprising a pair of legs extending outward from a base, each of said pair of legs comprising a bracket flange extending outward from said leg and contacting said shoulder portion when said dovetail mounting portion is within said dovetail groove, said bracket and biasing member positioned between said packing ring segments and said annular surface such that said packing ring segments are biasing radially outward at relatively low turbine loads and low working pressure, and at relatively high turbine loads and high working pressure a working fluid will overcome the radial biasing member forces and urge said packing ring segments radially inward.

10. A turbine diaphragm in accordance with claim 9 wherein said packing ring segments are biasing radially outward to form a relatively larger diameter ring providing a large clearance position of said seal ring with respect to said rotor.

11. A turbine diaphragm in accordance with claim 9 wherein said packing ring segments are configured such that when the working fluid is at a relatively high pressure, the working fluid urges said packing ring segments into a relatively small clearance position with respect to said shaft.

12. A turbine diaphragm in accordance with claim 9 wherein said groove is in fluid communication with a high pressure region upstream from said seal ring.

13. A turbine comprising:
a stationary turbine casing surrounding a rotatable shaft, said casing comprising an annular T-shaped groove formed therein and extending circumferentially around said shaft, said annular groove being partially defined by a pair of opposing, spaced apart annular shoulders on said casing which form an annular opening of said groove radially into the clearance area between said casing and said shaft; and
a segmented seal ring comprising a plurality of packing ring segments supported by and at least partially enclosed in said groove, said packing ring segments including a hollowed out portion that extends radially inward from an outer surface of at least one of said packing ring segments, said hollowed out portion including a bracket positioned within said hollowed out portion and a biasing member positioned within said bracket, said bracket comprising a pair of legs extending outward from a base, each of said pair of legs comprising a bracket flange extending outward from said leg and contacting one of said shoulders, said bracket and biasing member positioned between said packing ring segments and said annular shoulders such that said packing ring segments are biasing radially outward at relatively low turbine loads and low working pressure, and at relatively high turbine loads and high working pressure a working fluid will overcome the radial biasing member forces and urge said packing ring segments radially inward.

14. A turbine in accordance with claim 13 wherein said packing ring segments are biasing radially outward to form a relatively larger diameter ring providing a large clearance position of said seal ring with respect to said shaft.

15. A turbine in accordance with claim 13 wherein said packing ring segments are configured such that when the working fluid is at a relatively high pressure, the working fluid urges said packing ring segments into a relatively small clearance position with respect to said shaft.

16. A turbine in accordance with claim 13 wherein said groove is in fluid communication with a high pressure region upstream from said seal ring.

17. A turbine in accordance with claim 13 wherein said seal ring comprises a dovetail mounting portion that comprises a groove substantially aligned with a sealing portion, said groove being in fluid communication with said hollowed out portion.

18. A turbine in accordance with claim 17 wherein said bracket comprises a U-shaped bracket comprising a base configured to be positioned in said hollowed out portion.

19. A turbine in accordance with claim 18 wherein said biasing member coupled to said pair of annular shoulders of a dovetail groove through said U-shaped bracket such that a biasing force generated by said biasing member is transmitted to said pair of annular shoulders through said U-shaped bracket.

20. A turbine in accordance with claim 13 further comprising a biasing member retainer configured to retain said biasing member at least partially within said hollowed out portion.

* * * * *